US008488242B2

(12) United States Patent
Hill et al.

(10) Patent No.: US 8,488,242 B2
(45) Date of Patent: Jul. 16, 2013

(54) OPTICALLY VARIABLE DEVICE WITH DIFFRACTION-BASED MICRO-OPTICS, METHOD OF CREATING THE SAME, AND ARTICLE EMPLOYING THE SAME

(75) Inventors: Dean R. Hill, New Freedom, PA (US); Robert E. Renton, Boston (GB); Andrew K. Rowe, Tilton on the Hill (GB); Paul Dunn, Thurcaston (GB)

(73) Assignee: Opsec Security Group, Inc., Denver, CO (US)

( * ) Notice: Subject to any disclaimer, the term of this patent is extended or adjusted under 35 U.S.C. 154(b) by 1679 days.

(21) Appl. No.: 11/425,224

(22) Filed: Jun. 20, 2006

(65) Prior Publication Data
US 2007/0291362 A1     Dec. 20, 2007

(51) Int. Cl.
*G02B 27/44* (2006.01)
(52) U.S. Cl.
USPC .......................... 359/566; 359/565; 359/567
(58) Field of Classification Search
USPC .......................................................... 359/566
See application file for complete search history.

(56) References Cited

U.S. PATENT DOCUMENTS

| | | | | |
|---|---|---|---|---|
| 4,539,482 A * | 9/1985 | Nose | | 250/208.1 |
| 5,359,454 A | 10/1994 | Steenblik et al. | | |
| 5,447,335 A * | 9/1995 | Haslop | | 283/91 |
| 5,712,731 A | 1/1998 | Drinkwater et al. | | |
| 6,751,024 B1 * | 6/2004 | Rosenthal | | 359/626 |
| 7,762,591 B2 * | 7/2010 | Schilling et al. | | 283/106 |
| 2004/0247874 A1 * | 12/2004 | Ryzi et al. | | 428/410 |
| 2005/0128543 A1 * | 6/2005 | Phillips et al. | | 359/15 |
| 2005/0180020 A1 | 8/2005 | Steenblik et al. | | |
| 2006/0018021 A1 | 1/2006 | Tomkins et al. | | |
| 2008/0067801 A1 | 3/2008 | Schilling et al. | | |

FOREIGN PATENT DOCUMENTS

| | | |
|---|---|---|
| WO | WO 97/19820 | 6/1997 |
| WO | WO 2005/106601 | 11/2005 |
| WO | WO 2006/029744 | 3/2006 |
| WO | WO 2010121293 A1 * | 10/2010 |

OTHER PUBLICATIONS

Written Opinion issued in International Application No. PCT/US07/70171.
Hans Peter Herzig, Micro-Optics Elements, Systems and Applications, pp. 1-3, Taylor & Francis.
Extended European Search Report Issued in Application No. 07811993.0-1234 / 2038707 PCT/US2007/070171.
European Search Report issued Jan. 20, 2012 for European Patent Appl. No. 07811993.0.
Kamal et al., "Properties of moire magnifiers", Optical Engineering 37 (11) 3007-3014 (Nov. 1998), 7 pages.

* cited by examiner

*Primary Examiner* — Arnel C Lavarias
(74) *Attorney, Agent, or Firm* — Eckert Seamans Cherin & Mellott, LLC; Grant E. Coffield

(57) ABSTRACT

A security device includes an optically variable device (OVD) having diffraction-based micro-optics including at least one moiré magnified visual representation of a micro-object. A diffractive structure provides micro-objects with unique optical effects when the OVD is viewed through the micro-object structure from a predetermined relative observation point. In addition to magnifying the micro-objects, the diffractive structure can impart optical effects such as change in observed color, enhanced contrast, animation of the observed visual representation, and change in size or shape of the observed visual representation. The micro-objects and the diffractive structure can be disposed on the same or different portions of a substrate. A method of making OVDs, and an article employing such OVDs are also disclosed.

17 Claims, 8 Drawing Sheets

OPTICALLY VARIABLE DEVICE WITH DIFFRACTION-BASED MICRO-OPTICS, METHOD OF CREATING THE SAME, AND ARTICLE EMPLOYING THE SAME

BACKGROUND OF THE INVENTION

1. Field of the Invention

The invention relates generally to optically variable devices (OVDs) and, more particularly, to OVDs with diffraction-based micro-optics, such as, for example, magnified images of micro-objects, which change in appearance depending upon the relative location from which the OVD is observed. The invention also relates to a method of making OVDs having diffraction-based micro-optics, and to articles which employ OVDs with diffraction-based micro-optics, as a security device.

2. Description of the Related Art

An optically variable device (OVD) is a security device which creates a change or shift in appearance, such as, for example and without limitation, a change in color, when observed from different observation points. The evolution of the OVD stems largely from the search for a mechanism to resist counterfeiting of certain articles and products, or alternatively to render such copying obvious. For example, bank notes, certificates, security labels, drivers' licenses, and credit cards frequently employ one or more OVDs to resist counterfeiting.

A counterfeiting deterrent employed in some OVDs involves the use of one or more images that exhibit optical effects which cannot be reproduced using traditional printing and/or photocopying processes. In some instances, the images comprise holograms wherein when the OVD is viewed from a predetermined location, an optical effect results, such as, for example and without limitation, movement of the image. However, additional unique effects are continually needed to stay ahead of the counterfeiter's ability to access or develop new imaging technologies. Accordingly, other security mechanisms having image-related optical effects have evolved over time. One such optical effect is to exhibit at least one magnified version of an object or objects based upon the concept of moiré magnification, which is typically accomplished by employing an array of refractive lenses.

Typically, known OVD image magnification methods involve the steps of generating a plurality of micro-objects, selectively arranging the micro-objects, and providing a layer of overlying correspondingly arranged lenses. The lenses are usually spherical, or cylindrical. Thus, such OVDs generally comprise a top lens layer, an intermediate substrate, and a bottom print or object layer which contains the micro-object (s) that are to be magnified or otherwise altered when viewed through the lenses. The micro-object layer typically comprises printed artwork. Existing print technology limits the size of individual printed elements, which means that lens apertures of between about 50-250 µm are the limit to this configuration. Using the lens types mentioned above at these apertures requires focal lengths of similar magnitudes (e.g., about 50-250 µm) in order to achieve adequate optical performance. Accordingly, the lens parameters required to produce the desired optical effect are disadvantageous because, for example, they necessitate the overall thickness of the resultant security article to be much greater than desired. See, e.g., U.S. Pat. No. 5,712,731 (disclosing the lenses as having a thickness of 50-250 µm with a typical focal length of 200 µm). Such total thickness (e.g., about 250-450 µm or more) is not conducive for use with certain articles such as, for example and without limitation, bank notes, checks, security labels, and certificates.

Accordingly, attempts have been made to provide effective micro-optic security devices which are thinner (e.g., about 50 µm or less) and thus, are suitable for such applications. For example, U.S. Patent App. Pub. No. 2005/0180020 (Steenblik et al.) discloses a micro-optic security and image presentation system which utilizes a two-dimensional (2D) array of non-cylindrical lenses. Specifically, hexagonal base, multi-zonal lenses are employed instead. However, the unique design of the disclosed security device and lenses thereof necessitates the implementation of a new process and new equipment for making the devices.

In addition to the foregoing, there are other limitations associated with known micro-object and object magnification OVDs. Among them is the fact that they generally rely on principles of refraction. Specifically, although the refractive lenses which are employed are generally suitable for providing the desired magnification optical effect, they are rather limited in their ability to independently provide other additional unique optical effects when combined with printed micro-object arrays (e.g., without limitation, a positive to negative switch wherein the image and background change with respect to one another (i.e., dark to light or vice-versa); holographic effects; color changes and rates of color change; animation of the image). Such effects can be quite useful and effective as they exhibit easy to see visual effects that add to the magnified or virtual image and are, therefore, often desirable in verifying anti-counterfeit solutions. Moreover, because of the top lens layer, middle substrate, and bottom image layer construction of the aforementioned known OVDs, any attempt to achieve such additional optical effects essentially requires an entirely new OVD to be made in order to incorporate a different lens structure, additional structures for producing the desired optical effects, such as holograms, or both.

A further disadvantage is that it is extremely difficult to mass produce and/or reproduce refractive lens array structures and small object arrays using the primary manufacturing processes (e.g., without limitation, conventional embossing technology) employed in the industry.

A still further disadvantage is associated with the fact that conventional lens structures typically require a suitable refractive index difference at the lens boundaries, such as an air-to-lens interface. Where an air-to-lens interface is present, the lenses are susceptible to damage. This is particularly disadvantageous for articles which must be durable, such as, for example and without limitation, drivers' licenses and credit cards, which are frequently removed and inserted from a carrier, such as a purse or wallet.

There is, therefore, room for improvement in OVDs, such as, for example, OVDs which provide magnified visual representations of micro-objects, and in methods of making the same.

SUMMARY OF THE INVENTION

These needs and others are met by embodiments of the invention, which are directed to a security device including a thin (having a thickness of preferably about 5-250 microns and more preferably about 12-125 microns) diffraction-based optically variable device (OVD) with a plurality of micro-objects in combination with a corresponding diffractive element array provides the micro-object with a plurality of unique optical effects when the OVD is viewed from a predetermined observation point or points.

Generally, the OVD comprises a substrate including first portion and a second portion, a plurality of micro-objects disposed on the first portion, and a diffractive element, such as a diffractive structure, disposed on the second portion. The optical geometry is fixed and is such that the optically variable device is observed from a pre-determined relative point with respect to which the diffractive structure is disposed between the micro-object array and the observation point, at least one magnified visual representation of the micro-object is observed. This geometry cannot be changed but can be achieve in a variety of configurations. The order of the micro-object array and diffractive structure can be reversed with respect to the observer by the introduction of a reflecting, partially reflecting or scattering interface distal from the point of observation. In such cases however, the fixed optical geometry remains. The substrate comprises a generally planar member made from any known or suitable material, and including a first side and a second side. The first side is intermediate the second side and the observation point, and the second side is distal from the observation point. In one embodiment, the first and second portions of the substrate are both proximate the second side such that the micro-object and the diffractive structure are either adjacent one another or integral with one another, while in other embodiments the micro-object may be disposed adjacent the first side of the substrate with the diffractive grating structure being disposed adjacent the second side.

In one embodiment, the micro-object array and diffractive elements can be manufactured on separate substrates and permanently combined (i.e., laminated). This is for specific applications of laminates such as plastic cards and passports. In another embodiment, the micro-object array or diffractive elements can be manufactured on a substrate with corresponding element (object arrays or diffractive elements) being manufactured on a separate substrate to be combined together by the observer to reveal the magnified image of the micro-object. This can be used as an authentication verification device.

The micro-objects may be comprised of diffractive elements or any combination of diffractive elements, reflective elements, refractive elements, diffuse elements or other suitable surface relief elements, and the micro-object layer may comprise a plurality of micro-objects selectively organized in an object layer. The object layer may be coupled to the substrate, for example, by an adhesive, or by embossing, casting, or injection molding into or onto the substrate. The layer of selectively organized micro-objects may be, but need not necessarily be removable. The OVD may further comprise at least one additional layer selected from the group consisting of a metallic layer, a partially transparent and partially reflective layer, a reflective layer, a protective layer, and an additional substrate. The protective layer may overly at least one of the diffractive structure, at least one of the at least one micro-object, and at least one of the substrate.

The diffractive grating structure may comprise a plurality of diffracting elements selectively organized into a diffractive layer wherein the elements of the diffractive layer are structured to diffract light at different wavelengths depending upon the predetermined relative observation point from which the OVD is viewed. The diffractive elements may be disposed in a concentric circular pattern or linear pattern. The diffractive structure may also comprise one or more diffractive elements in which the grating shape (i.e., profile) is altered to induce specific optical advantages or effects. For example, at least one of the diffractive elements may comprise a plurality of blazed grooves or gratings, and the blazed gratings may be generally disposed in a concentric circular or linear pattern. In addition to the at least one magnified version of the micro-object, the diffractive elements may be structured to impart (by themselves or by combination with the micro-object structure) one or more additional predetermined optical effects. Such additional optical effects may be selected from the group consisting of a change in observed color, changes in contrast relating to the angles of illumination and observation, a movement or animation of the observed visual representation of the object, a change in the size or shape of the observed visual representation of the objects, and a transformation of the observed visual representation of the object into a second, different object or optical effect.

A method of creating the foregoing OVDs, and articles which contain such OVDs, are also disclosed.

It is, therefore, an object of the invention to provide an OVD including diffraction-based micro-optics, such as a micro-object and a diffractive grating structure which exhibit the effect of presenting at least one magnified visual representation of the micro-object.

It is a further object of the invention to provide an OVD which can magnify the micro-object without requiring a plurality of refracting lenses, such as, for example and without limitation, spherical lenses, cylindrical lenses or other suitable lenses.

It is another object of the invention to provide an OVD which in one embodiment has different diffractive structures.

It is another object of the invention to provide an OVD having a color change feature wherein the object and/or the background of the object display a change in color corresponding to a change in the relative observation point from which the OVD is viewed.

It is yet another object of the invention to provide an OVD including a diffractive layer, a substrate layer, and an object layer, wherein the OVD is viewed through the object layer with the diffractive layer being disposed behind or integral with the object layer and including a reflecting, partially reflecting or scattering interface distal to the observation point.

It is another object of the invention to provide a durable OVD wherein at least the diffractive layer is covered by a protective layer or coating.

It is another object of the invention to provide an OVD which is sufficiently thin to be suitable for use on thin articles expressly including, but not limited to, paper articles, such as, for example and without limitation, bank notes, checks, security labels, and certificates.

It is another object of the invention to provide an OVD wherein a variety of different objects, such as, for example, pictures, patterns, images or graphics, can be substituted or interchanged without requiring an entirely new OVD to be made.

It is another object of the invention to employ one or more OVDs which exhibit the foregoing attributes on an article or product as a security device for verifying the authenticity of the article or product, and/or resisting counterfeiting of the article or product.

It is yet another object of the invention to provide an authentic article which incorporates at least one OVD which exhibits one or more of the foregoing attributes.

It is a further object of the invention to provide a method of creating an OVD exhibiting one or more of the foregoing attributes.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
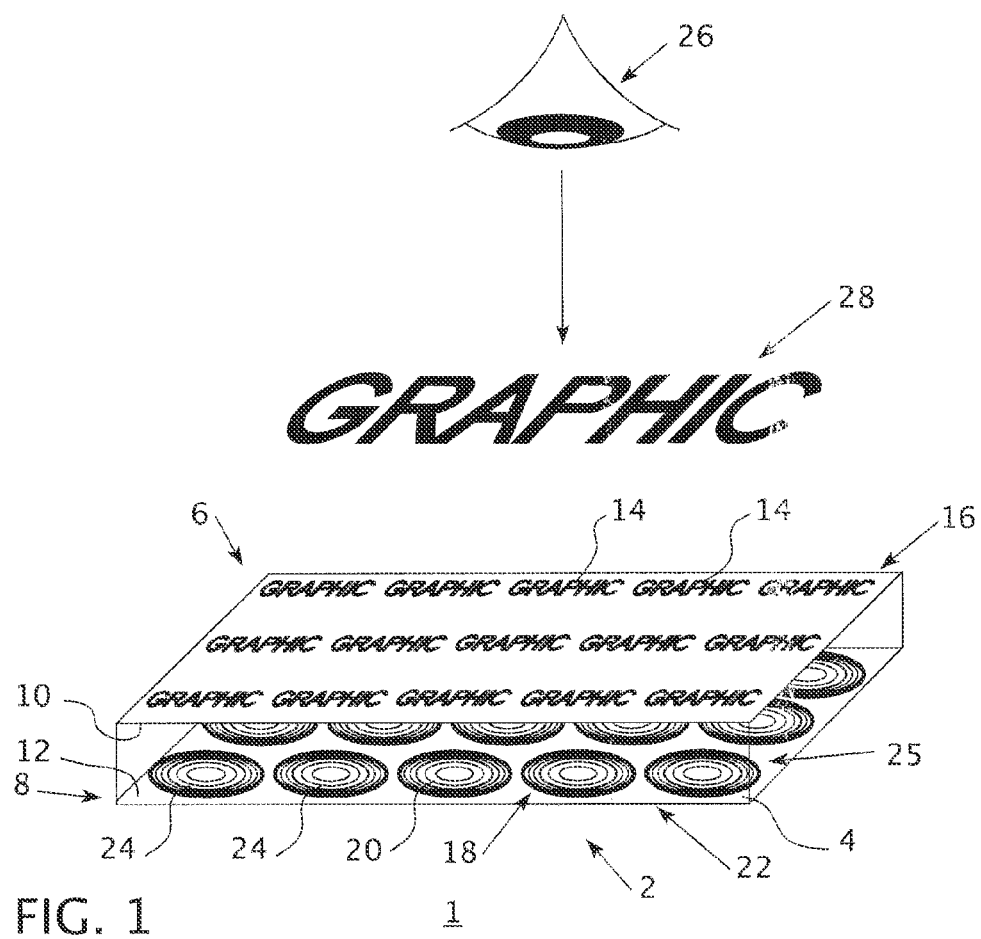
FIG. 1 is a simplified and exaggerated perspective view of an optically variable device (OVD) in accordance with an embodiment of the invention.

As employed herein, the term "optically variable device" (OVD) is used in its conventional broad sense and includes the use of a single optical element alone or multiple optical elements arranged in an array which may or may not be touching each other, overlapping, or physically in close proximity to each other. Thus, a "security device" as employed herein, refers to any known or suitable device which employs one or more OVDs in order to verify the authenticity of the article on which the security device is disposed, and to deter and resist copying or counterfeiting of the article.

As employed herein, the phrases "optical effects," "visual effects," "diffractive effects" and derivatives thereof, refer to the visual characteristics, such as, for example and without limitation, change in observed color, rate of color change, change in shape and/or dimension, magnification, movement or animation, transformation from one such optical effect to another, and any suitable combination of the foregoing, which are exhibited by the OVD of the invention and thus, are observed either by the naked eye or by machine when viewing the same from a predetermined relative observation point or points.

As employed herein, the terms "article" and "informational article" refer to an item or product on which the exemplary OVD is employed, and expressly include, without limitation, articles used in the high-security, banking, identification, and brand protection markets, such as, for example, identification cards, credit cards, debit cards, smart cards, organization membership cards, security system cards, security entry permits, bank notes, checks, fiscal tax stamps, passport laminates, legal documents, packaging labels and other information providing articles wherein it may be desirable to validate the authenticity of the article and/or to resist alteration, tampering or reproduction thereof.

As employed herein, the term "micro-object" refers to any known or suitable graphic, picture, array, pattern, relief structure, or the like which is implemented within the exemplary OVD or OVDs for purposes of exhibiting a desired optical effect (e.g., without limitation, movement or animation; magnification; color change). By way of example, an optical effect in accordance with one embodiment of the invention, is to provide a magnified visual representation of the micro-object when the OVD is viewed from a predetermined relative observation point. One or more micro-objects may be arranged by themselves or in combination with other objects, elements, and arrays, in any suitable configuration, in order to form an "object array," "object layer" or "micro-object layer" in accordance with embodiments of the invention.

As employed herein, the phrase "diffractive structure" refers to any known or suitable configuration of selectively arranged lines, gratings, grooves, etchings, imprints or other structures which diffract light at a variety of wavelengths in a manner which produces the desired optical effects and micro-optics, as defined herein. Diffractive structures in accordance with the invention expressly include, without limitation, "diffractive elements," "diffractive arrays," and "diffractive layers." Accordingly, the term "diffraction-based," is used herein in accordance with its ordinary meaning to refer to structures which function based upon principles of light diffraction as opposed to, for example, principles of refracting light.

It will be appreciated that for, simplicity of illustration, the example OVDs shown in the figures and described herein in accordance with the invention, are shown in simplified and exaggerated form in the figures. Specifically, in order to more clearly show the features or components, elements, layers, and overall structure of the OVDs, certain features of the OVDs, such as the thickness of various structures, have been illustrated in exaggerated form and, therefore, are not to scale.

Figure 2:
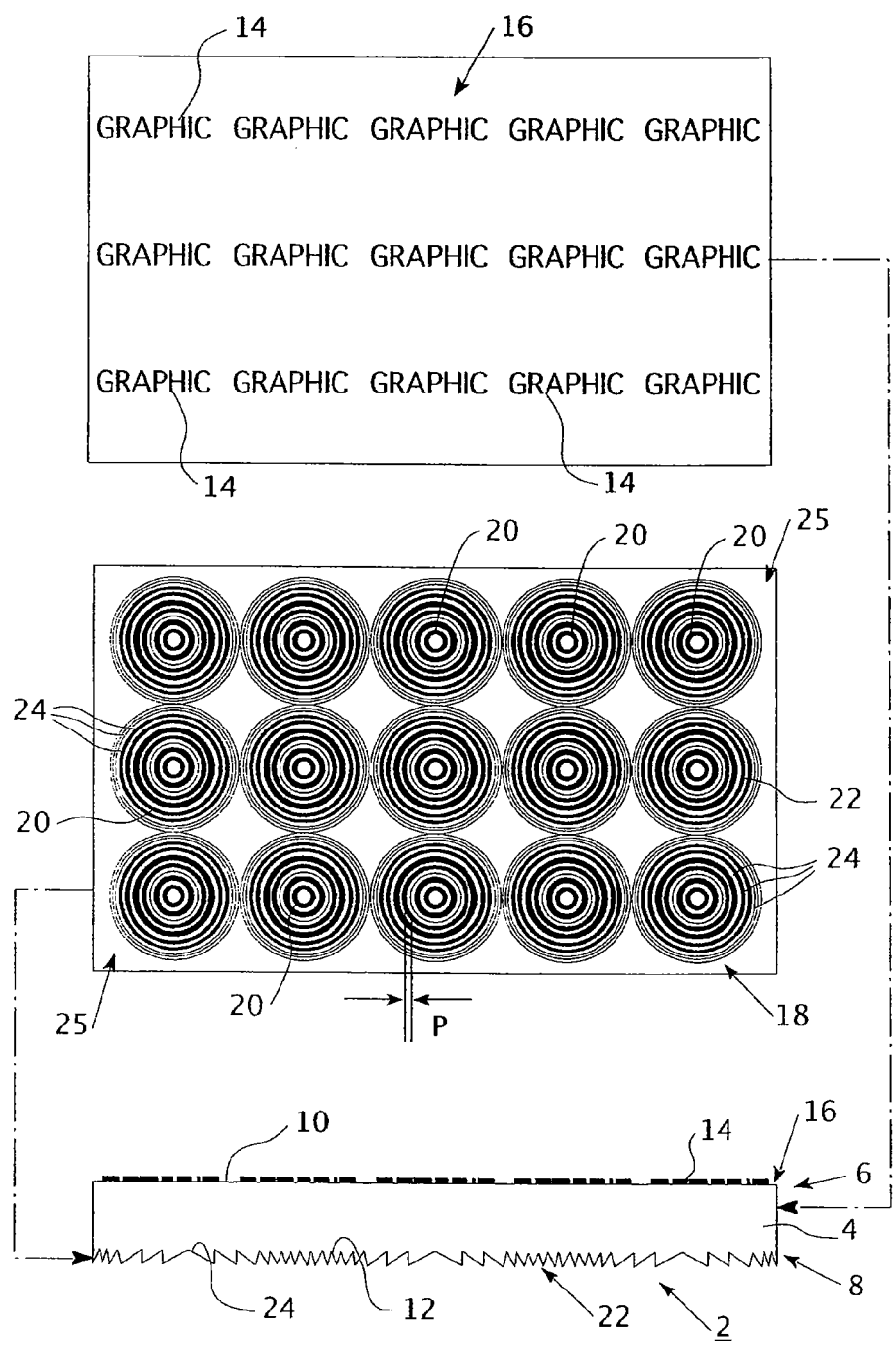
FIG. 2 is an exploded view of the OVD of FIG. 1, showing a top plan view of the object layer and diffractive layer of the OVD, and a simplified, exaggerated side elevational view of the entire OVD.

FIGS. 1 and 2 show a security device 1 having a diffraction-based OVD 2 for exhibiting optical effects, including a magnified visual representation or image 28 of micro-object(s) 14. The OVD 2 includes a substrate 4 having a first portion 6 and a second portion 8. At least one micro-object 14 is disposed on the first portion 6, and a diffractive element, such as the diffractive structure 18 shown, is disposed on the second portion 8. When the OVD 2 is observed from a predetermined relative observation point 26 (FIG. 1) wherein the micro-objects 14 are disposed between the diffractive structure 18 and the observation point 26, at least one magnified visual representation 28 of one of the micro-objects 14 is observed above (from the perspective of FIG. 1) the OVD 2.

The substrate 4 comprises a generally planer member made from any known or suitable material, such as, for example, polyester, polystyrene, polypropylene, or cellulose acetate, and includes a first side 10 and a second side 12. The first side 10 is disposed intermediate the second side 12 and the observation point 26 (FIG. 1). The second side 12 is distal from the observation point 26 (FIG. 1) such that the OVD 2 is viewed through the micro-object(s) 14. In other words, unlike known moiré magnification OVDs, the diffractive structure 18 of OVD 2 of the invention is disposed behind the micro-object(s) 14 with respect to observation point 26.

In the example of FIGS. 1 and 2, the first and second portions 6, 8 of the substrate 4 generally comprise the first and second sides 10, 12 of the substrate 4, such that the micro-objects 14 are disposed on the first side 10 and the diffractive structure 18 is disposed on the second side 12. It will, however, be appreciated that, as discussed hereinbelow with respect to FIGS. 4A, 4B, and 4C, the layers and components of the OVD 2 could be arranged in any suitable alternative configuration. For example, the micro-objects 14 and diffractive structure 18 could both be disposed on the same portion of the substrate 4 (see, for example, FIG. 4C where micro-objects 314 and diffractive structure 318 are integral with one another and are both disposed on second portion 308 of substrate 304).

In the example of FIG. 2, a plurality of micro-objects 14 are selectively organized in an object layer 16. For simplicity of illustration, the micro-objects 14 are shown as comprising the word "GRAPHIC" repeated and selectively arranged to form the object layer 16. It will, however, be appreciated that any known or suitable configuration or arrangement of micro-objects including, for example and without limitation, letters, words, patterns, images, symbols, figures, pictures, and suitable combinations thereof, could be employed. As will be discussed herein, the object layer 16 can be implemented directly on the substrate 4 or alternatively may be created on a suitable transfer medium and be subsequently coupled to the substrate 4 by any known or suitable adhesive (see, for example, FIG. 4B). In the example of FIG. 2, the diffractive grating structure 18 comprises a plurality of diffractive elements 20 selectively organized into a diffractive layer 22. The diffractive elements 20 of the diffractive layer 22 are structured to diffract light at different wavelengths depending upon the predetermined relative observation point 26 (FIG. 1) from which the OVD 2 is viewed, or alternatively, when the OVD 2 is moved or rotated with respect to the observation point 26 (FIG. 1). In this manner, the OVD 2 and grating structure 18 thereof exhibit optical effects such as, for example, providing the aforementioned magnified visual representation 28 (FIG. 1) of one of the micro-objects 14, or changing the observed color of such magnified visual representation 28, changing the observed color of the diffractive grating structure 18 (i.e., the background of the magnified visual representation 28), or both, or animating (i.e., moving) the magnified visual representation 28, of the micro-objects 14 (see, for example, FIG. 8).

In FIG. 2, the diffractive elements 20 comprise a plurality of concentric circular grooves or gratings 24 with a blazed profile when viewed from the side or end elevational prospective. It will, however, be appreciated that, for example linear, oval or other suitably shaped grooves or gratings 24, having other diffractive profiles can be employed without departing from the scope of the invention. Examples are shown generally in FIGS. 3A, 3B and 3C, which illustrate square, blazed, and sinusoidal grating structure profiles, respectively. Changing the diffractive profile of the gratings 24 (FIG. 2) creates optical effects and features that are difficult, if not impossible, to provide using conventional lenses. Also significant is that the fringes 25 (FIG. 1) or incomplete edge portions of the diffractive elements 20 (FIG. 1) can be accurately made, thereby offering control over the efficiency and direction with which light is diffracted by the gratings 24. This enables the introduction and control of various additional optical effects, such as the introduction and control of the color of the background behind the micro-objects 14, and other variations in observed appearance of the substrate 4, and enhanced observed contrast, for example, between observed magnified visual representation 28 of one or more of the micro-objects 14 and the background of the micro-objects 14.

The blazed gratings 24 are generally disposed in a concentric circular pattern, as shown in the top plan view of diffractive layer 22, although it will be appreciated that any known or suitable regularly or irregularly, concentric or non-concentric grating structure configuration (not shown) could be alternatively employed. For example, the grating structure could include closed-loop lines or grooves which are not concentric (not shown) and/or lines or grooves which are not closed loop, such as, for example and without limitation, a series of vectors (not shown). Also, as previously noted, the outer portions of the grating elements 20 may include the aforementioned incomplete portions or fringes 25, as shown in FIG. 2. Thus, if desired, the grating structure 18 could have solely loops of any shape, or solely lines, grooves or fringes 25, or any suitable combination of lines, loops, and fringes 25. Regardless of the configuration, each of the grooves or gratings 24 of the diffractive grating structure 18 is selectively created and oriented at a predetermined interval or spacing, in order to achieve the desired optical effects. For example and without limitation, in one embodiment of the invention, the distance between adjacent grooves 24, indicated by the letter P in FIG. 2, is selected to achieve a lens-type optical effect of magnifying the micro-objects 14 to exhibit magnified visual representation 28 (FIG. 1 shows one of the micro-objects 14). Thus, changing diffractive grating structure parameters, such as the shape of the grooves 24, or the spacing, P, therebetween, results in different optical effects being exhibited by the OVD 2 when viewed from predetermined relative observation points 26 (FIG. 1), or when the OVD 2 is moved (i.e., rotated) with respect to the observation point 26. These principles, as applied to provide overt and covert coded information and optical effects such as color changes and patterns, are explained in detail in commonly assigned, U.S. Published Patent Application No. 2006/0018021 entitled, "Diffraction-based Optical Grating Structure and Method of Creating Same," which is hereby incorporated herein by reference.

Accordingly, the invention employs a diffractive layer 22 structured to provide micro-optics, for example, in accordance with the principles of moiré magnification, without requiring conventional lenses, such as cylindrical or spherical lenses. It will, however, be appreciated that any known or suitable diffractive grating structure 18 and configuration other than the six diffractive element 20, blazed grating 24 diffractive layer 22 shown in the example of FIGS. 1 and 2, could be employed without departing from the scope of the invention.

Figure 3A:
FIGS. 3A, 3B, and 3C are three side elevational views of example diffractive grating structure profiles in accordance with embodiments of the invention.
Figure 3B:
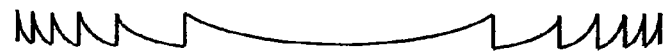
Figure 3C:

In addition to the wide variety of diffractive grating structure profiles, examples of which are shown in FIGS. 3A, 3B, and 3C, OVDs in accordance with embodiments of the invention may have a wide variety of layer constructions, as will now be discussed with reference to FIGS. 4A, 4B, and 4C. It will be noted, however, that in each of the following examples, the OVD 102, 202, 302 is viewed, rather unconventionally, through the object or micro-object layer 116, 216, 316.

Figure 4A:
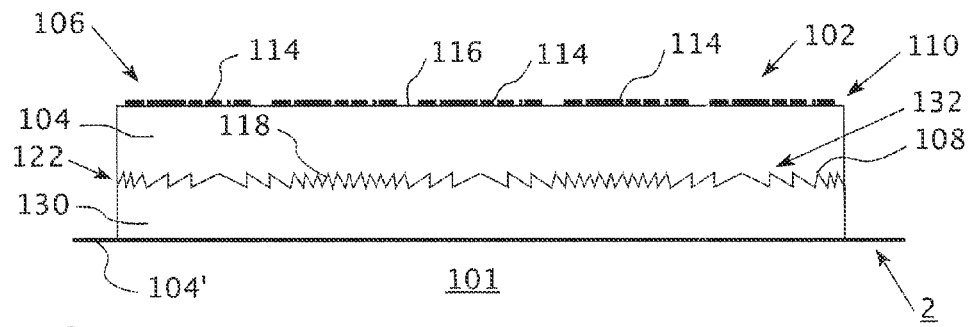
FIGS. 4A, 4B, and 4C are exaggerated side elevational views of three example OVD layer constructions in accordance with embodiments of the invention.

In the example of FIG. 4A, a security device 101 is shown having an OVD 102 with the aforementioned layer construction wherein the object layer 116 with micro-objects 114 is disposed on the first portion 106 or first side 110 of substrate 104, and the diffractive grating structure 118 is disposed on the second portion 108. However, further included on the opposite side of the diffractive layer 122, is an adhesive layer 130 to facilitate attachment of the OVD 102 to a second substrate 104'. In this example, the second substrate 104' is the document of value or article that employs the OVD 102 as a security device 101 to verify the authenticity of the article 104' and/or protect against counterfeiting or fraudulent alteration. Additionally, a reflective layer (indicated generally by reference 132) is incorporated with the diffractive layer 122 in order to provide additional desired optical effects, such as, for example and without limitation, a predetermined change in observed color. It will be appreciated that the reflective layer 132 may comprise a metallized layer with portions which are generally opaque, and/or a layer with a high refractive index which is substantially transparent or semi-transparent.

Figure 4B:
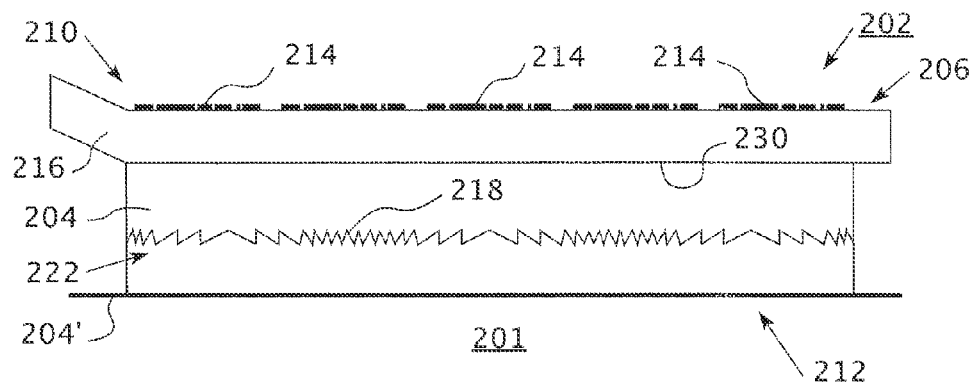

FIG. 4B shows an example wherein the image layer 216 is removable such that a variety of different micro-objects 214 can be readily interchanged on the first side 210 of substrate 204 of the OVD 202. The removable object layer 216 is coupled to the first portion 206 of substrate 204 by any known or suitable adhesive 230. The second side 212 of the OVD 202 is likewise coupled to a second substrate 204'. Thus, a security device 201 having a variable OVD 202 for which the micro-objects 214 thereof may be interchanged, is provided, and can be applied to a wide variety of articles 204' (e.g., without limitation, bank notes, certificates, security labels, drivers' licenses, and credit cards.

Figure 4C:
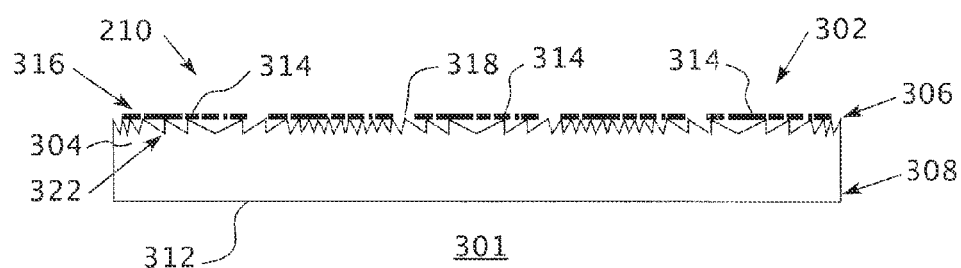

FIG. 4C shows another example security device 301 and OVD 302 therefor, in accordance with another embodiment of the invention. Specifically, in the example of FIG. 4C, the object layer 316 and diffractive grating structure 318 are integral with one another such that the first and second portions 306, 308 of substrate 304 are both disposed proximate the second side 312 of substrate 304. In this manner, the micro-objects 314 are an integral part of diffractive grating structure 318. Specifically, the micro-objects 314 and other suitable elements of the object layer 316 can be integrated with the diffractive grating structure 318 and diffractive layer 322 at the design phase. The OVD 302 can then be passed into the normal production process, as will be discussed hereinbelow.

Figure 5A:
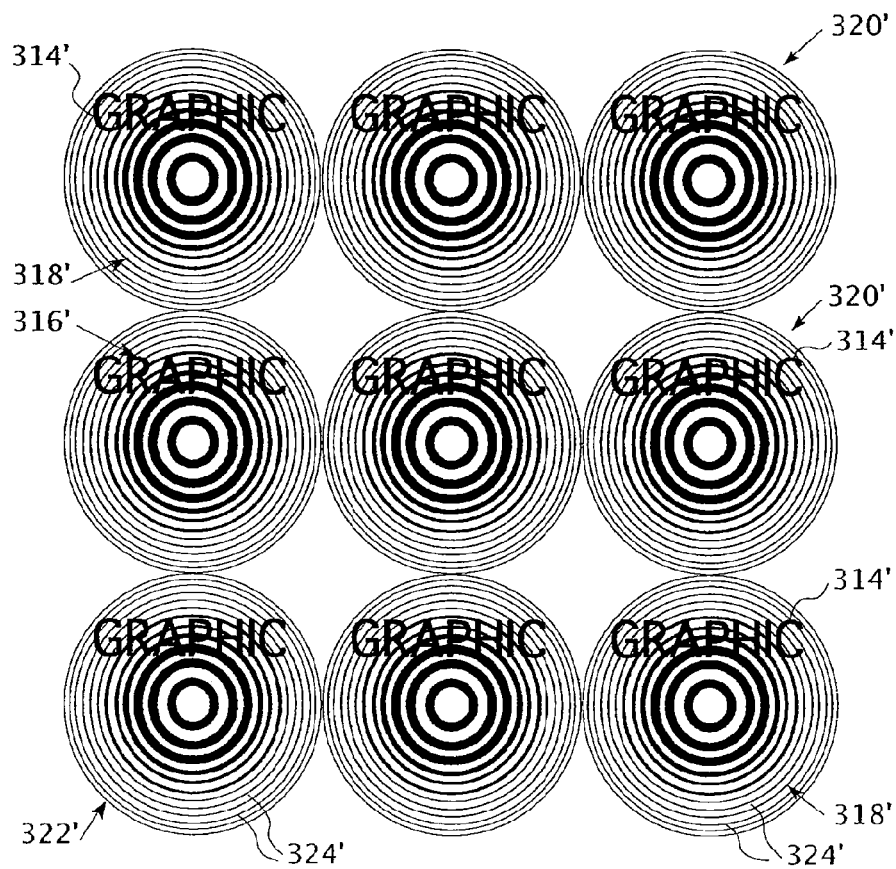
FIG. 5A is a top plan view of a portion of an OVD having integral object and diffractive layers in accordance with another embodiment of the invention.
Figure 5B:
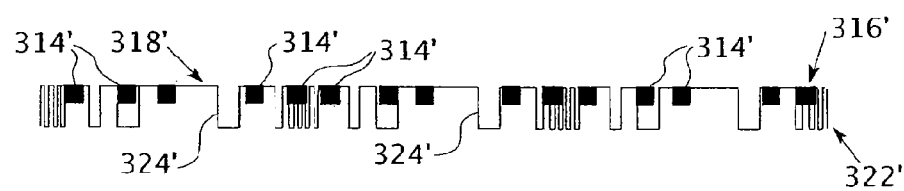
FIG. 5B is a side elevational view of the portion of the OVD of FIG. 5A.

FIGS. 5A and 5B show a top plan view and an end elevational view, respectively, of the integral object and diffractive layers 316', 322' of an OVD which is substantially similar to OVD 302 of FIG. 4C. However, as shown in FIG. 5A, none of the six diffractive elements 320' of the diffractive layer 322' have any fringes 25 (FIG. 2) and, as shown in FIG. 5B, the lines or grooves 324' of the diffractive grating structure 318' of diffractive layer 322' have a square profile, as opposed to the blazed profile in the examples of FIGS. 1, 2, 3B, and FIGS. 4A, 4B, and 4C.

Integration of the object layer 316' with the diffractive layer 322' is a concept which is unique to the invention and is vastly different from known conventional lens OVD designs and techniques. Specifically, it teaches away from the traditional spacing required by known conventional lenses wherein the object layer is separated from the diffractive layer by at least a distance equivalent to the thickness of the substrate on which the object layer is disposed on one side and the lenses are disposed on the opposite side. Conversely, in the examples of FIGS. 4C, 5A, 5B, and 6 (discussed hereinbelow), the micro-objects 314' are formed (e.g., without limitation, printed; etched via electron beam) on the same layer as the diffractive grating structure 318'. Thus, as best shown in FIG. 5B, the object layer 316' and the diffractive layer 322' are essentially one and the same. The ability to so integrate the layers 316', 322' is unique to diffractive grating structures. It is done, for example, at the origination exposure stage of the process (discussed hereinafter). As such, integration of the object and diffractive layers 316', 322' simplifies the manufacturing process. Perhaps more importantly, however, is the fact that it allows the thickness of the OVD to be kept to a minimum, thereby broadening the use of the technology to a wider range of security applications than known conventional lens OVDs. More specifically, OVDs 302 (FIG. 4C) can be suitably employed as a security device 301 on thin (e.g., about 5-250 microns) articles, such as, for example, certificates, bank notes, and other paper articles of value.

Figure 6:
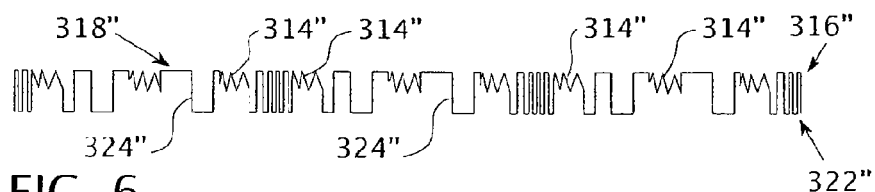
FIG. 6 is a side elevational view of a diffractive grating structure in accordance with another embodiment of the invention.

FIG. 6 shows another end elevational view of an OVD (not expressly shown) having integral object and diffractive layers 316", 322". Like diffractive layer 322' of FIG. 5B, the diffractive layer 322" has a diffractive grating structure 318" with grooves or lines 324" having a square profile when viewed from an end elevational perspective. However, the micro-objects 314" of the object layer 316" have been modified or altered to create a different or an additional optical effect, than that produced by the micro-objects 314' of FIG. 5B, which are printed or written integrally with diffractive layer 322". This is another possibility unique to diffractive structures. In the example of FIG. 6, a micro-object 314" having a sinusoidal diffractive grating profile (from the perspective of FIG. 6) is provided. Such additional object information is provided, for example, by electron beam technology. It will be appreciated, however, that a wide variety of other object layer structures could be created such as, for example and without limitation, a different diffractive grating profile, to provide unique color effects, contrast changes, and image switching, diffuse to create a white object array and to contribute to a clear white/black effect between the observed object and the background behind the observed object, an object layer which is reflective and is substantially planar with no surface interruption, print, and high frequency diffractive gratings.

Figure 7:
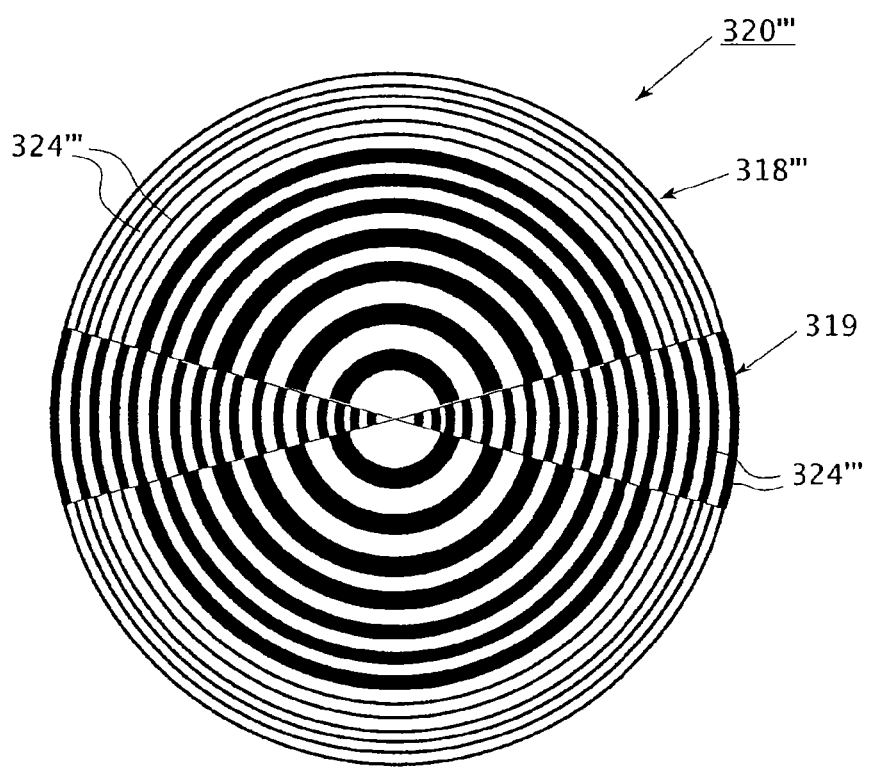
FIG. 7 is a top plan view of a diffractive element containing two different diffractive grating structures, each having a different frequency.

FIG. 7 shows an example of a diffractive element 320''' having an additionally diffractive grating structure 319 with a different frequency range than the remainder of the diffractive grating structure 318'''. Specifically, diffractive grating structure 319 has a greater frequency range than diffractive grating structure 318'''. In other words, the gratings or grooves 324''' are closer together for diffractive grating structure 319 than for diffractive grating structure 318'''. Thus, multiple different optical effects are achieved in one diffractive element 320''', without adding to the overall thickness of the structure.

Accordingly, as shown and discussed with respect to FIGS. 4C, 5A, 5B, 6 and 7, it will be appreciated that using diffractive layers in accordance with the invention enables a plurality of different diffractive structures to be included in a single layer, and that this combined diffractive layer can then be made integral with the object layer, as shown and described in FIGS. 4C, 5A, 5B, 6 and 7, or alternatively, it may be employed in place of the aforementioned diffractive layers 22, 122, 222 shown and described with respect to FIGS. 1, 2 4A, and 4B.

In any event, enhanced micro-optics and other optical effects can be incorporated in the OVD during the origination process. Generally, the optical effects afforded by the aforementioned additional grating structures will be observed as affecting the background, and not the observed visual representation of the micro-objects. However, they can enhance the impact of the observed visual representation and provide such additional optical effects as, for example, variations in color with change in the angle from which the OVD is observed, additional background objects being seen at discrete relative observation points, and stereo image effects in the background areas, wherein the object appears to be animated. All of the foregoing can be created in addition to, and in combination with, the moiré magnified micro-objects, previously discussed.

Figure 8:
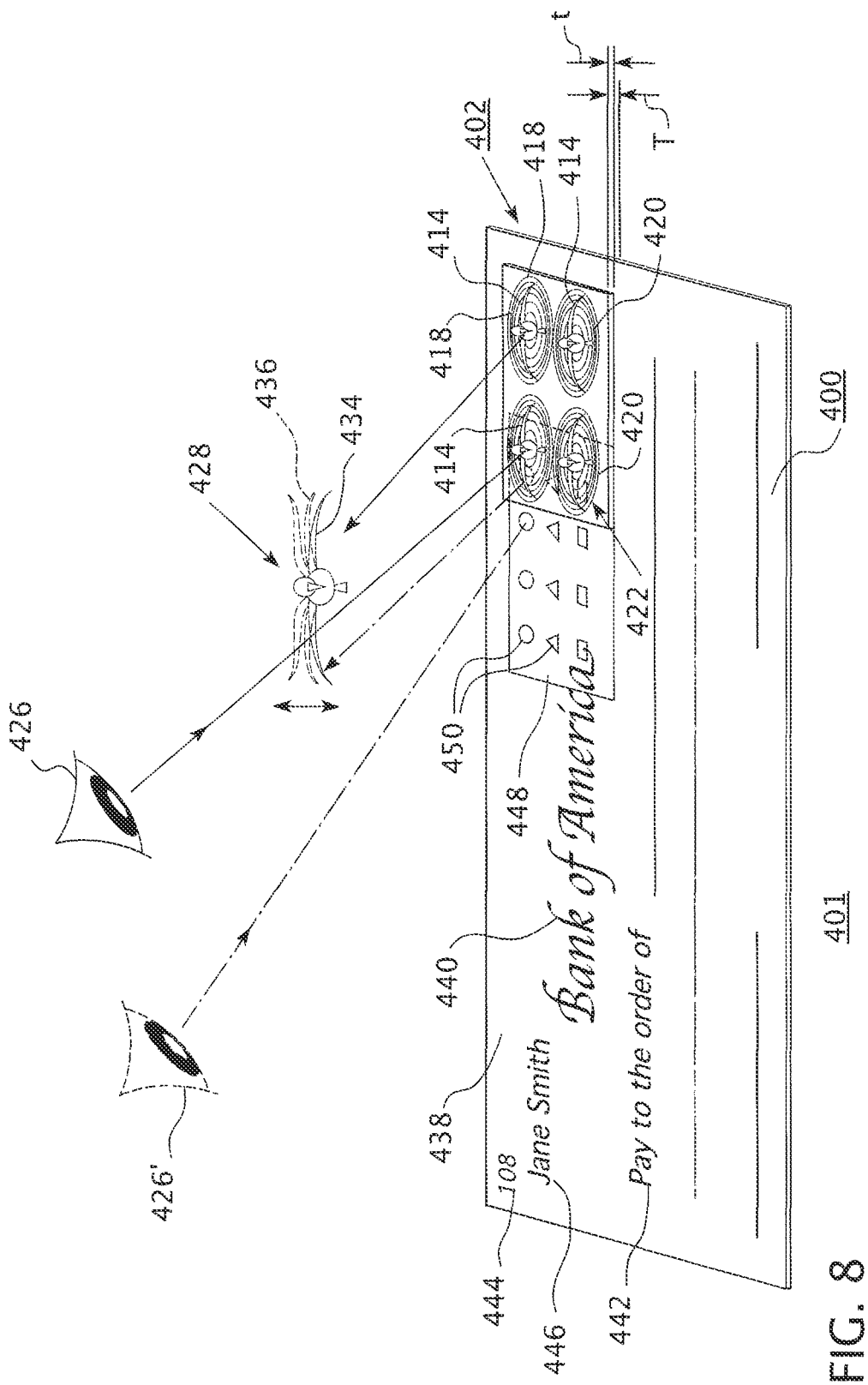
FIG. 8 is a simplified and exaggerated perspective view of a personal check employing an OVD with diffraction-based micro-optics in accordance with an embodiment of the invention.

FIG. 8 shows an example article 400 employing a security device 401 with a diffraction-based OVD 402 having micro-optics in accordance with one embodiment of the invention. Specifically, a personal check 400 is shown to incorporate an OVD 402 which exhibits a magnified and animated visual representation 428 of a micro-objects 414, when viewed from the predetermined relative observation points 426, 426', or when the article 400 is rotated or moved with respect to one of the observation points 426, 426'. The OVD 402 is also employed in combination with a variety of other tamperresistant and/or anti-counterfeiting mechanisms. More specifically, the OVD 402 in the example of FIG. 8 includes four micro-objects which are micro-images 414 of a bird, and four diffractive elements 420 selectively arranged with respect thereto, in order that a moiré magnified bird image 428 optical effect is exhibited when the article 400 is viewed from the first observation point 426. Additionally, the bird micro-images 414 are selectively arranged such that when the OVD 402 is viewed from second observation point 426', the moiré magnified bird image 428 appears to be animated, or to move. In order to achieve the foregoing optical effect, each of the bird micro-images 414 is slightly different (i.e., the position of the bird's wings are different). In other words, when viewed from first observation point 426, the observed moiré magnified bird image 428 appears in a first position designated by reference 434 and, when the observation point is changed to observation point 426' (shown in phantom line drawing), the position of moiré magnified bird image 428 changes to that represented by reference 436 (shown in phantom line drawing). In this manner, the observed magnified bird image 428 appears to move or be animated, such that the bird is flapping its wings. The foregoing is achieved by way of the diffractive grating structure 418 in the micro-object layer 422 wherein the orientation of the diffractive grating structure 418 is different between the micro-object 414 and the background such that light is diffracted from each of these areas differently, and is observed at different times upon moving or rotating the article 400 or upon changing the relative observation point 426, 426'.

The OVD 402 in the example of FIG. 8 is also employed in conjunction with other counterfeit-resistant measures, some of which are generally old and well known. For example, a hologram 448 is employed partially underlying the OVD 402, and a plurality of photocopy resistant particles 450 are incorporated in the hologram 448, in the example shown. Additionally, the article 400 itself contains fixed information 440, or information that remains the same on each similar article 400 which is produced, such as the "Bank of America" logo 440 and the phrase "Paid to the order of" 442. In combination with this fixed information 440, is variable information, or information on the article 400 which would be different from one article 400 to the next. For instance, in the personal check example of FIG. 8, the check number "108" 444 in the upper left hand corner of the check 400 will change from check-to-check, and the name of the individual "Jane Smith" 446 will also change for each set of personalized checks.

Accordingly, the invention provides a method wherein, in one non-limiting example, personalized checks 400 can be made to include a customized OVD 402 having one or more optical effects which are customized so as to be readily associated with the owner of the check 400, an thus function as a security device 401. In this manner, unauthorized duplication of the check 400 would be resisted, because it is relatively simple to determine whether or not the check 400 is authentic.

In addition to all of the aforementioned advantages, the thickness of the OVD 402 is sufficiently thin with respect to the overall thickness, T, of the article 400 that it is suitable for use on paper articles such as the exemplary check 400. In the example of FIG. 8, the thickness, t, of OVD 402 is about 12-125 microns, and the overall thickness, T, of the check 400 and OVD 402 therefor, is only about 125-250 microns. However, it will be appreciated that OVDs having a thickness, t, that is within or outside of this range could be employed on articles having any thickness, T. In the example of FIG. 8, thickness, T, includes protective layer 438 which overlies the OVD 402 and article 400. It will be appreciated that protective layer 438 can comprise any known or suitable material, such as a laminate, or a coating, such as a lacquer, overlying at least one of the diffracting grating structure 418, the micro-objects 414, the substrate (not expressly shown in FIG. 8), and the article itself 400. Accordingly, a durable security device 401 is provided which, unlike known conventional lens refractive-based OVDs, does not require a lens-to-air interface. In other words, the diffractive grating structure 418 and other elements of the OVD 402 are covered, and protected.

It will also be appreciated that any known or suitable optical method can be employed to produce the aforementioned diffractive grating structures 18, 118, 218, 318, 318', 318", 318''', 319, 418. The preferred method of creating the lines or grooves (e.g., blazed gratings 24 of FIGS. 1 and 2), which comprise the diffractive grating structure (e.g., 18) includes, for example, electron or ion beam lithography to inscribe the grating, although a conventional laser beam could also be employed. The structure can then be transformed, for example, into a surface micro-relief structure in order to facilitate replication. Accordingly, it will be appreciated that the OVD (e.g., 2) can be applied directly to any number of objects, products, or articles, or it may alternatively be made on a separate substrate and later applied to such article or product.

Figure 9:
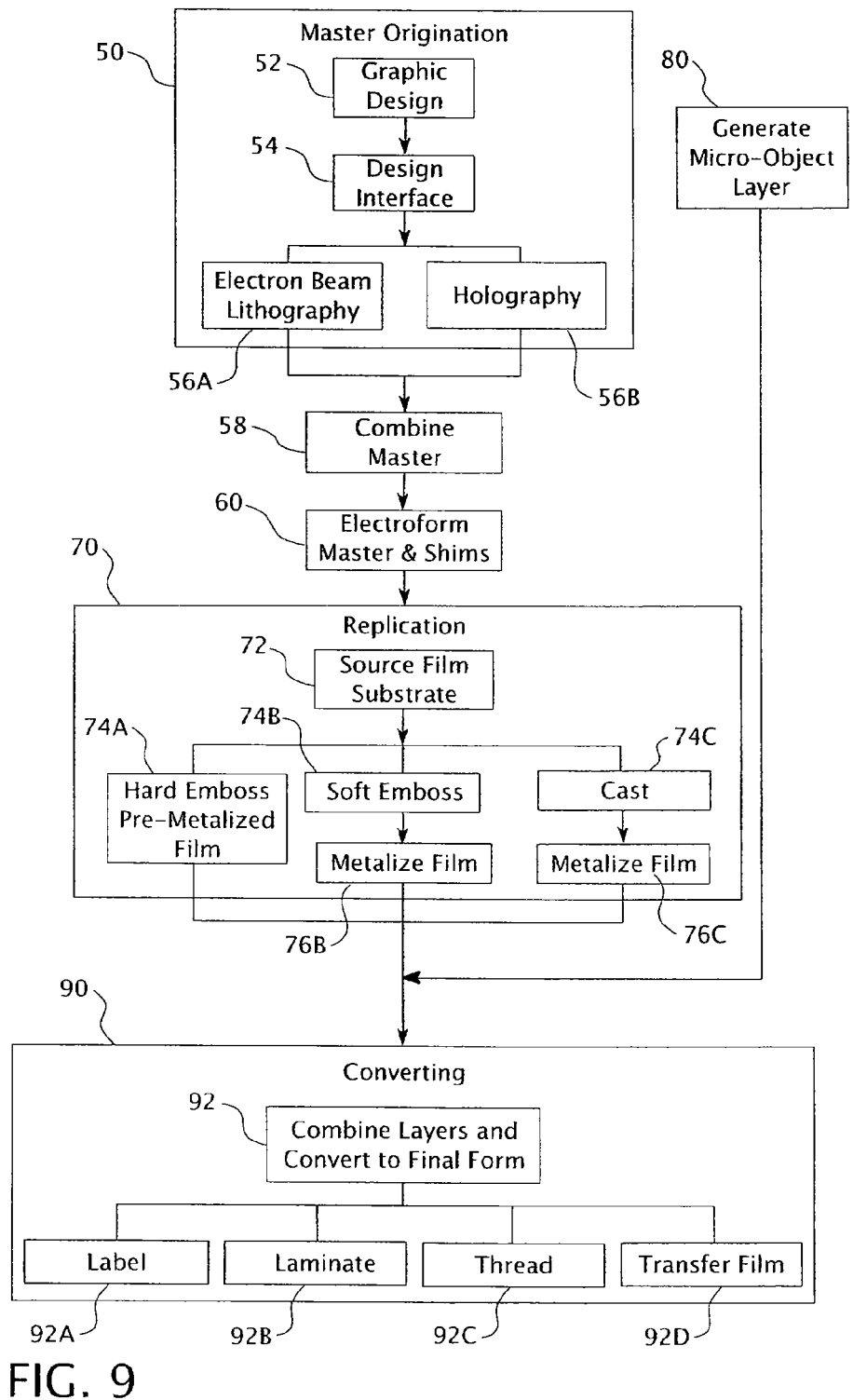
FIG. 9 is a flow diagram illustrating the steps of a method of making the OVD, in accordance with an embodiment of the invention.

FIG. 9 shows the steps of a method of creating an OVD 2 having diffraction-based micro-optics in accordance with the invention. As previously discussed, the diffractive grating structure 18 is preferably produced as a surface relief structure. In other words, the grating is preferably produced as grooves 24 in a master plate (not expressly shown). This permits the diffractive grating structure 18 to then be replicated, in mass, by mass reproduction methods such as, for example and without limitation, embossing into a thermoplastic film using applied heat and pressure, casting liquid resin onto the grating structure and curing the resin to create a film, and injection molding. In this manner, a master OVD may be created and replicated as a laminate film, label, transfer of foil, or any other suitable transfer medium. This can be accomplished in a manner similar to the way embossed holograms are known to be mass produced. Specifically, a replicated diffractive grating structure is preferably coated with a vacuum deposited metal, such as, for example and without limitation, aluminum or other highly reflective metal, or other suitable materials having a high refractive index, such as zinc sulfide, in order to achieve both transparency and reflection. The replicated structure can then either be applied to the article with a label, transfer film, lamination or other suitable transfer medium, or alternatively it may be incorporated as an integral part of the article during the manufacture thereof.

More specifically, as shown in FIG. 9, the method includes the general steps or processes 50, 70, and 90 of master origination, replication of the master, and conversion of the replication into final form, respectively. Within each of these steps 50, 70, 90 are a number of additional sub-steps, some of which are required, and others of which are optional, as well now be discussed.

For instance, the master origination step 50 in the example process of FIG. 9 includes the further steps of graphic design 52 wherein the diffractive grating structure is created, design interface 54 wherein the design of step 52 is interfaced with the desired equipment for generating the master. As shown, once the interfacing step 54 has been completed, electron beam lithography and/or holography are employed in steps 56A and 56B, respectively, to begin producing the design of the diffractive grating structure. However, it will be appreciated that in other embodiments of the invention (not expressly shown), an ion or laser beam could be employed. In step 58 the elements of the design are combined and in step 60, the master and/or shims are made, preferably by the generally well known process of electroforming. Specifically, the master of the OVD which is to be replicated, is produced in steps 58 and 60 on a printing plate or master plate commonly referred to as a shim. A shim generally comprises a thin piece of metal, such as nickel, which is mounted, for example, on a press for subsequently replicating the master OVD, which is contained on the shim's surface.

The replication step 70 further includes step 72 of providing the substrate which, in the example shown, is a source film material. The master is then replicated on the substrate by one of a hard emboss, step 74A, a soft emboss, step 74B, or by casting, step 74C. These processes are generally performed in the manner which is known in the art. Specifically, a hard emboss involves the use of a pre-metallized film. However, if either the soft embossing or casting methods of steps 74B and 74C are employed, an additional step 76B, 76C of metallizing the film is required, as shown.

The foregoing steps are employed to generate and replicate the diffractive layer or layers of the OVD. As shown in FIG. 9, the micro-object layer is generally separately created in step 80 and then as part of the conversion process 90, the two layers are combined in a step 92. As previously discussed, the diffractive layer and the object layer may be combined with the substrate such that they are on different portions or sides of the substrate (FIGS. 1, 2, 4A, 4B) or alternatively, the micro-object layer can be disposed on the same side or portion of the substrate as the diffractive layer, and can even be made integral with the diffractive layer (FIGS. 4C, 5A, 5B and 6). Where the object layer is combined integrally with the diffractive layer, steps 80 and 92 are essentially combined into one step with the micro-objects 314' being directly micro-printed onto the diffractive layer 322', as best shown in FIGS. 5A and 5B, such that the layers 316', 322' are integral with one another. Alternatively, the diffractive layer and object layer could be recorded together by direct generation of segregated portions of the diffractive elements and micro-object elements, for example, using electron beam lithography. If this approach is used, such recording would take place earlier as part of the aforementioned master origination process 50.

It will also be appreciated that, as part of the conversion process 90, further processing steps such as providing the OVD with a protective layer or coating, are also contemplated by the invention. For example, one or more additional layers, such as a metallic layer, a transparent refractive layer, or reflective layer, a protective layer, or an additional substrate, could be added to the existing object layer, substrate, and/or diffractive layer construction (see, for example, FIG. 4A).

Also in step 92, the OVD is converted to final form. Specifically, the OVD is produced as a label, step 92A, as a laminate, step 92B, as a thread, step 92C, or as a transfer film, step 92D. Each of these final forms has an appropriate application on a particular type and configuration of an article. For example, a label is created with the OVD directly applied to it, with the label being subsequently affixed to an article in order to function as a security device or mechanism for authenticating the article. For example, such labels are commonly employed on automobile license plates and inspection stickers to verify the registration and inspection status of the vehicle. Laminates can be applied to a wide variety of articles, for example, as a coating or covering. For example, hang tags which are attached to goods to provide authentication of the goods, often include one or more OVDs in laminate form. Thread comprises a delivery system of the OVD wherein the thread is woven or slid into the article with which it will be employed as a security device. Thin articles, such as valuable paper articles, often contain OVDs in thread form. Finally, transfer films comprise any type of film, such as, for example, foils, wherein the OVD is applied by hot or cold stamping the foil, and subsequently transferring the foil to the article.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An optically variable device comprising:
   a substrate including a first portion and a second portion;
   at least one micro-object disposed on the first portion of said substrate; and
   a diffractive structure disposed on the second portion of said substrate,
   wherein at least one magnified visual representation of said micro-object is observed when said optically variable device is observed from a predetermined relative observation point and said micro-object is disposed between said diffractive structure and said observation point.

2. The optically variable device of claim 1 wherein said substrate comprises a generally planar member including a first side and a second side; wherein the first side is intermediate the second side and said predetermined relative observation point; and wherein the second side is distal from said observation point.

3. The optically variable device of claim 2 wherein the first and second portions of said substrate are both at or about the second side of said substrate.

4. The optically variable device of claim 3 wherein said micro-object is integral with said diffractive structure.

5. The optically variable device of claim 2 wherein the first portion of said substrate is at or about the first side of said substrate; and wherein the second portion of the substrate is at or about the second side of said substrate.

6. The optically variable device of claim 1 wherein said substrate comprises a material selected from the group consisting of a film, a laminate, a thread, a foil, a label, and a casting.

7. The optically variable device of claim 1 wherein said at least one micro-object comprises a plurality of micro-objects selectively organized in an object layer; wherein said object layer is coupled to said substrate by an adhesive; and wherein said object layer is removable from said substrate.

8. The optically variable device of claim 1 further comprising at least one additional layer selected from the group consisting of a metallic layer, a transparent refractive layer, a reflective layer, a protective layer, and an additional substrate.

9. The optically variable device of claim 1 wherein said diffractive structure comprises a plurality of diffractive elements selectively organized into a diffractive layer; and wherein said diffractive elements of said diffractive layer are structured to diffract light at different wavelengths depending upon the predetermined relative observation point from which said optically variable device is viewed.

10. The optically variable device of claim 9 wherein in addition to said at least one magnified visual representation of said micro-object, said diffractive elements are structured to impart at least one additional predetermined optical effect selected from the group consisting of a change in observed color, enhanced contrast between said at least one magnified visual representation of said micro-object and background, a movement or animation of said at least one magnified visual representation, a change in the size or shape of said magnified visual representation, and a transformation of said magnified visual representation into a different object or optical effect.

11. The optically variable device of claim 1 wherein said optically variable device has a thickness; and wherein the thickness of said optically variable device is about 5-250 microns.

12. An article comprising:
a surface; and
at least one security device coupled to said surface in order to resist counterfeiting of said article, said security device including at least one optically variable device with diffraction-based micro-optics, said optically variable device comprising:
a substrate including a first portion and a second portion,
at least one micro-object disposed on the first portion of said substrate, and
a diffractive structure disposed on the second portion of said substrate,
wherein at least one magnified visual representation of said micro-objects is observed when said optically variable device is observed from a predetermined relative observation point from and said micro-object is disposed between said diffractive structure and said observation point.

13. The article of claim 12 wherein said substrate comprises a generally planar member including a first side and a second side; wherein the first side is intermediate the second side and said observation point; and wherein the second side is distal from said observation point.

14. The article of claim 13 wherein the first and second portions of said substrate are both at or about the second side of said substrate.

15. The article of claim 13 wherein the first portion of said substrate is at or about the first side of the substrate; and wherein the second portion of the substrate is at or about the second side of said substrate.

16. The article of claim 12 wherein said at least one micro-object comprises a plurality of micro-objects selectively organized in an object layer; wherein said diffractive structure comprises a plurality of diffractive elements selectively organized into a diffractive layer; and wherein said diffractive elements of said diffractive layer diffract light at different wavelengths depending upon the predetermined relative observation point from which said optically variable device is viewed.

17. The article of claim 12 wherein in addition to said at least one magnified visual representation of said micro-object, said diffractive elements impart at least one additional predetermined optical effect selected from the group consisting of a change in observed color, enhanced contrast between said at least one magnified visual representation of said micro-object and background, a movement or animation of said at least one magnified visual representation of said micro-object, a change in the size or shape of said magnified visual representation, and a transformation of said magnified visual representation into a different object or optical effect.

* * * * *